United States Patent
Masaoka

(10) Patent No.: US 9,647,461 B2
(45) Date of Patent: May 9, 2017

(54) NON-CONTACT POWER SUPPLY SYSTEM AND CONTROL METHOD FOR NON-CONTACT POWER SUPPLY SYSTEM

(71) Applicant: THE CHUGOKU ELECTRIC POWER CO., INC., Hiroshima (JP)

(72) Inventor: Shinya Masaoka, Hiroshima (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 298 days.

(21) Appl. No.: 14/429,603

(22) PCT Filed: Nov. 15, 2012

(86) PCT No.: PCT/JP2012/079682
§ 371 (c)(1),
(2) Date: Mar. 19, 2015

(87) PCT Pub. No.: WO2014/076801
PCT Pub. Date: May 22, 2014

(65) Prior Publication Data
US 2015/0255990 A1 Sep. 10, 2015

(51) Int. Cl.
*H01F 27/42* (2006.01)
*H01F 37/00* (2006.01)
(Continued)

(52) U.S. Cl.
CPC .............. *H02J 5/005* (2013.01); *H02J 7/025* (2013.01); *H02J 50/12* (2016.02); *H02J 50/50* (2016.02);
(Continued)

(58) Field of Classification Search
USPC .................................. 307/104; 361/139–141
See application file for complete search history.

(56) References Cited

U.S. PATENT DOCUMENTS 8,178,995 B2 * 5/2012 Amano ................. B60L 11/182
307/104
8,508,184 B2 * 8/2013 Sakakibara ............. B60L 5/005
180/65.1
(Continued)

FOREIGN PATENT DOCUMENTS

CN 102484397 A 5/2012
JP 2009-261157 A 11/2009
(Continued)

OTHER PUBLICATIONS

Office Action issued in corresponding Chinese Application No. 201280075897.3 dated Jul. 6, 2016, and English translation thereof (16 pages).
(Continued)

*Primary Examiner* — Adam Houston
(74) *Attorney, Agent, or Firm* — Osha Liang LLP

(57) ABSTRACT

A non-contact power supply system, in which a first transmission efficiency of supply power in the case of supplying power in a first power supply mode of directly supplying power from a power supply apparatus to a power receiving apparatus and also supplying power to the power receiving apparatus through a relay apparatus, and a second transmission efficiency in the case of supplying the power in a second power supply mode of directly supplying the power from the power supply apparatus to the power receiving apparatus and not supplying the power from the power supply apparatus to the power receiving apparatus through the relay apparatus are compared.

6 Claims, 12 Drawing Sheets

(51) Int. Cl.
| | | |
|---|---|---|
| *H01F 38/00* | (2006.01) | |
| *H02J 5/00* | (2016.01) | |
| *H02J 7/02* | (2016.01) | |
| *H02J 50/12* | (2016.01) | |
| *H02J 50/80* | (2016.01) | |
| *H02J 50/50* | (2016.01) | |
| *H02J 7/00* | (2006.01) | |

(52) U.S. Cl.
CPC ....... *H02J 50/80* (2016.02); *H02J 2007/0001* (2013.01); *H02J 2007/0096* (2013.01)

(56) References Cited

U.S. PATENT DOCUMENTS

| | | | | |
|---|---|---|---|---|
| 8,664,801 B2* | 3/2014 | Abe | ........................ | H02J 7/025 |
| | | | | 307/104 |
| 8,928,182 B2* | 1/2015 | Kurata | .................... | H02J 17/00 |
| | | | | 307/104 |
| 8,941,268 B2* | 1/2015 | Suzuki | .................... | H02J 5/005 |
| | | | | 307/104 |
| 9,024,482 B2* | 5/2015 | Kamata | .................. | H02J 7/025 |
| | | | | 307/104 |
| 9,035,500 B2* | 5/2015 | Gotani | .................... | H01F 38/14 |
| | | | | 307/104 |
| 9,041,253 B2* | 5/2015 | Yun | .......................... | H03H 3/00 |
| | | | | 307/104 |
| 9,143,010 B2* | 9/2015 | Urano | .................... | H02J 17/00 |
| 9,240,270 B2* | 1/2016 | Wu | .......................... | H01F 27/00 |
| 9,293,950 B2* | 3/2016 | Cho | ........................ | H02J 17/00 |
| 9,396,869 B2* | 7/2016 | Hsu | ........................ | H01F 38/14 |
| 9,397,518 B1* | 7/2016 | Theobald | ................ | H02J 7/025 |
| 9,412,513 B2* | 8/2016 | Saitoh | .................... | H01F 38/14 |
| 9,558,884 B2* | 1/2017 | Shimokawa | ............ | H02J 17/00 |
| 9,564,940 B2* | 2/2017 | Park | ...................... | H04B 5/0037 |
| 2011/0304216 A1 | 12/2011 | Baarman | | |
| 2012/0001497 A1 | 1/2012 | Sada et al. | | |
| 2012/0223586 A1 | 9/2012 | Gotani | | |
| 2015/0255990 A1* | 9/2015 | Masaoka | ................ | H02J 7/025 |
| | | | | 307/104 |

FOREIGN PATENT DOCUMENTS

| | | | |
|---|---|---|---|
| JP | 2011-030293 A | | 2/2011 |
| JP | 2011-147280 A | | 7/2011 |
| JP | 2011-151989 A | | 8/2011 |
| JP | 2011-160505 A | | 8/2011 |
| JP | 2012-075304 A | | 4/2012 |
| JP | 2012-223070 A | | 11/2012 |
| WO | 2010/041320 A1 | | 4/2010 |
| WO | 2010/106636 A1 | | 9/2010 |
| WO | 2012/001959 A1 | | 1/2012 |

OTHER PUBLICATIONS

International Search Report issued in PCT/JP2012/079682 mailed on Jul. 16, 2013 (2 pages).
Written Opinion of the International Searching Authority issued in PCT/JP2012/079682 mailed on Jul. 16, 2013 (10 pages).
Notification of Transmittal of Translation of the International Preliminary Report on Patentability in corresponding PCT Application No. PCT/JP2012/079682, mailed May 28, 2015.
International Preliminary Report on Patentability for corresponding International Application No. # PCT/JP2012/079682, mailed May 19, 2015 (1 page).
Notification of Reasons for Rejection in corresponding Japanese Application No. 2014-511663 issued on May 7, 2014 (6 pages).
Notification of Reasons for Rejection in corresponding Japanese Application No. 2014-511663 issued on Aug. 19, 2014 (5 pages).
Final Notification of Reasons for Rejection in corresponding Japanese Application No. 2014-511663 issued on Oct. 28. 2014 (6 pages).
Decision of Rejection in corresponding Japanese Application No. 2014-511663 issued on Feb. 10, 2015 (4 pages).
Extended European Search Report issued in corresponding European Patent Application 12888520.9 dated Jun. 9, 2016(7 pages).
Office Action issued in corresponding Korean Application No. 10-2015-7006424 dated Dec. 1, 2016, and English translation thereof (6 pages).

* cited by examiner

NON-CONTACT POWER SUPPLY SYSTEM AND CONTROL METHOD FOR NON-CONTACT POWER SUPPLY SYSTEM

TECHNICAL FIELD

Embodiments of the present invention generally relate to a non-contact power supply system and a control method for the non-contact power supply system, and particularly relates to a technique for efficiently performing non-contact power supply from a power supply side to a power receiving side.

BACKGROUND

Regarding non-contact power supply of supplying power from a power supply apparatus to a power receiving apparatus in a non-contact manner, for example, Patent Literature 1 describes a wireless charging system including a wireless charging apparatus including a power transmission device that transmits power for charging, a power receiving apparatus that includes a power receiving device which receives the power transmitted from the wireless charging apparatus by a magnetic resonance relation and that charges the received power to a battery, and a relay device capable of relaying the transmission power of the power transmission device of the wireless charging apparatus.

Patent Literature 2 describes that, in a wireless system including a sheet-like body, a power transmission side resonance coil that is supplied with power and transmits the power, and at least one relay coil capable of receiving and transmitting the transmitted power by a magnetic resonance relation, the power transmission side resonance coil and the relay coil are formed in a sheet shape, and the power transmission side resonance coil and the relay coil are arranged on the sheet-like body at a predetermined interval.

Patent Literature 3 describes that, in a wireless power supply system including a power transmission device including a first resonance element that is supplied with power and transmits the power, a relay device including a second resonance element that receives and transmits the transmitted power by a magnetic resonance relation, and a power receiving device including a third resonance element that receives the power transmitted from the relay device by the magnetic resonance relation, the relay device adjusts at least one of an arrangement angle and an arrangement position of the second resonance element according to power transmission information of at least one of the power transmission device and the power receiving device.

CITATION LIST

Patent Literature

Patent Literature 1: Japanese Patent Laid-Open No. 2011-160505
Patent Literature 2: Japanese Patent Laid-Open No. 2011-151989
Patent Literature 3: Japanese Patent Laid-Open No. 2011-147280

SUMMARY OF INVENTION

In non-contact power supply, a relay apparatus (a relay coil, a relay device or the like) is provided for the purpose of improving transmission efficiency; however, depending on influence of interference of power supplied through different routes with each other, multipath, reflected waves, or the like, there is a case that the transmission efficiency is rather lowered by providing a relay apparatus.

One or more embodiments of the present invention provide a non-contact power supply system capable of efficiently supplying power in the case of providing a relay apparatus and performing non-contact power supply from a power supply apparatus to a power receiving apparatus, and a control method for the non-contact power supply system.

One or more embodiments of the present invention provide a non-contact power supply system including a power supply apparatus, a power receiving apparatus, and a relay apparatus, in which first transmission efficiency which is transmission efficiency of supply power in the case of supplying power in a first power supply mode of directly supplying the power from the power supply apparatus to the power receiving apparatus and also supplying the power from the power supply apparatus to the power receiving apparatus through the relay apparatus, and second transmission efficiency which is transmission efficiency of supply power in the case of supplying the power in a second power supply mode of directly supplying the power from the power supply apparatus to the power receiving apparatus and not supplying the power from the power supply apparatus to the power receiving apparatus through the relay apparatus are compared, the power is supplied from the power supply apparatus to the power receiving apparatus in the second power supply mode in the case that the second transmission efficiency is higher than the first transmission efficiency, and the power is supplied from the power supply apparatus to the power receiving apparatus in the first power supply mode in the case that the second transmission efficiency is equal to or lower than the first transmission efficiency.

According to one or more embodiments of the invention, in the case that the second transmission efficiency is higher than the first transmission efficiency, that is, in the case that the transmission efficiency is rather lowered by providing a relay apparatus depending on influence of interference, multipath, reflected waves, or the like, the power is supplied from the power supply apparatus to the power receiving apparatus in the second power supply mode, that is, without interposing the relay apparatus, so that the mode in which the higher transmission efficiency can be obtained is appropriately selected and non-contact power supply can be efficiently performed from the power supply apparatus to the power receiving apparatus.

Also, one or more other embodiments of the present invention provide the non-contact power supply system, in which the power is supplied from the power supply apparatus to the power receiving apparatus in an magnetic resonance mode, and in the case of supplying the power in the second power supply mode, by executing control so that a resonant circuit of the power supply apparatus and a resonant circuit of the relay apparatus do not resonate, the power supplied from the relay apparatus to the power receiving apparatus is attenuated. More specifically, the control is executed so that the resonant circuit of the power supply apparatus and the resonant circuit of the relay apparatus do not resonate by changing capacitance or inductance of an element configuring the resonant circuit of the relay apparatus.

By attenuating the power supplied from the relay apparatus to the power receiving apparatus by such a method, a mechanism of selecting the first power supply mode or the second power supply mode by a simple mechanism can be achieved.

Also, one or more other embodiments of the present invention provide the non-contact power supply system, in which a mechanism that controls orientation of the resonant circuit of the relay apparatus for receiving supply power transmitted from the power supply apparatus is provided, and in the case of supplying the power in the second power supply mode, by controlling the orientation of the resonant circuit of the relay apparatus, the power supplied from the relay apparatus to the power receiving apparatus is attenuated.

Also, one or more other embodiments of the present invention provide the non-contact power supply system, in which a shield control mechanism that controls whether or not to interpose a shield between the power supply apparatus and the relay apparatus is provided, and in the case of supplying the power in the second power supply mode, by interposing a shield between the power supply apparatus and the relay apparatus, the power supplied from the relay apparatus to the power receiving apparatus is attenuated.

One or more other embodiments disclosed by the present application will be made clear by the description of embodiments and the drawings.

Advantageous Effect of Invention

According to one or more embodiments of the present invention, in the case of providing a relay apparatus and performing non-contact power supply from a power supply apparatus to a power receiving apparatus, power can be efficiently supplied.

DETAILED DESCRIPTION

Figure 1:
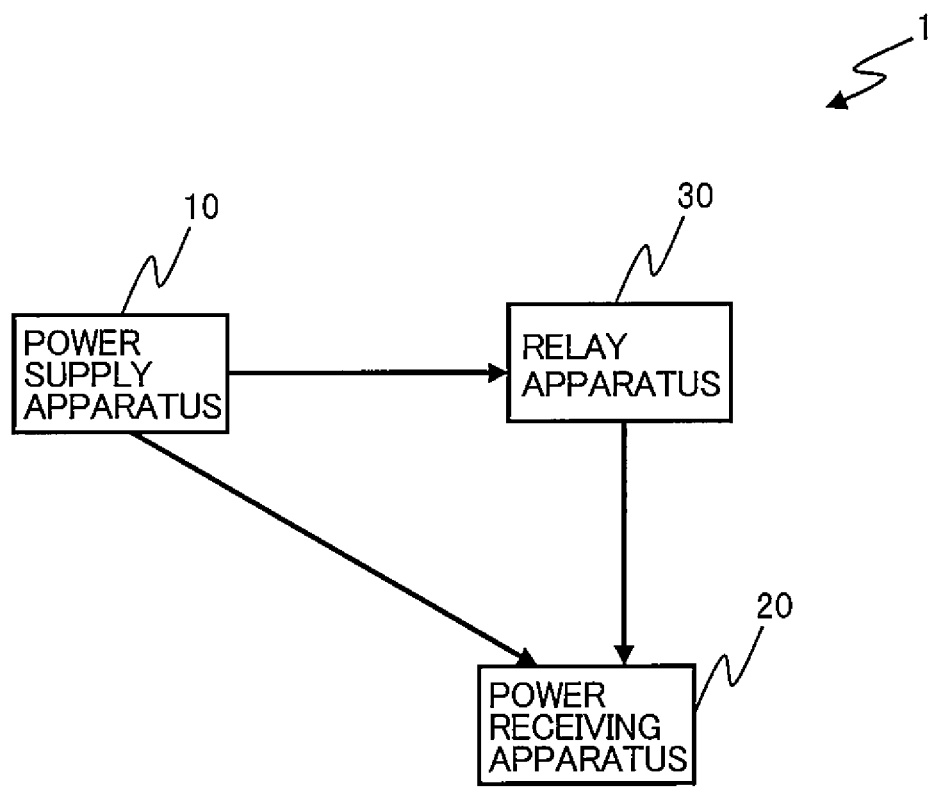
FIG. 1 is a diagram illustrating a schematic configuration of a non-contact power supply system 1 according to one or more embodiments.

FIG. 1 illustrates a schematic configuration of a non-contact power supply system 1 to be described according to one or more embodiments. As illustrated in the figure, the non-contact power supply system 1 includes a power supply apparatus 10, a power receiving apparatus 20 that receives power supply by non-contact power supply from the power supply apparatus 10, and a relay apparatus 30 provided for the purpose of improving transmission efficiency of the non-contact power supply. The power receiving apparatus 20 is, for example, a cellular phone, a personal digital assistant, a small-sized household electrical appliance, an electric automobile, or the like. A mode of the non-contact power supply is, for example, an electromagnetic wave mode, a magnetic resonance mode, or an electromagnetic induction mode. In one or more embodiments, it is assumed that the non-contact power supply is performed in the magnetic resonance mode among them.

The non-contact power supply system 1 can supply power in a "first power supply mode" which is a mode of directly supplying the power from the power supply apparatus 10 to the power receiving apparatus 20 and also supplying the power from the power supply apparatus 10 to the power receiving apparatus 20 through the relay apparatus 30. Also, the non-contact power supply system 1 can supply the power in a "second power supply mode" which is a mode of directly supplying the power from the power supply apparatus 10 to the power receiving apparatus 20 and not supplying the power from the power supply apparatus 10 to the power receiving apparatus 20 through the relay apparatus 30.

As described below, to perform the non-contact power supply, the non-contact power supply system 1 compares "first transmission efficiency" which is the transmission efficiency of supply power in the case of supplying the power in the first power supply mode with "second transmission efficiency" which is the transmission efficiency of supply power in the case of supplying the power in the second power supply mode. Then, the non-contact power supply system 1 executes control so as to supply the power from the power supply apparatus 10 to the power receiving apparatus 20 in the second power supply mode in the case that the second transmission efficiency is higher than the first transmission efficiency, and to supply the power from the power supply apparatus 10 to the power receiving apparatus 20 in the first power supply mode in the case that the second transmission efficiency is equal to or lower than the first transmission efficiency.

Figure 2:
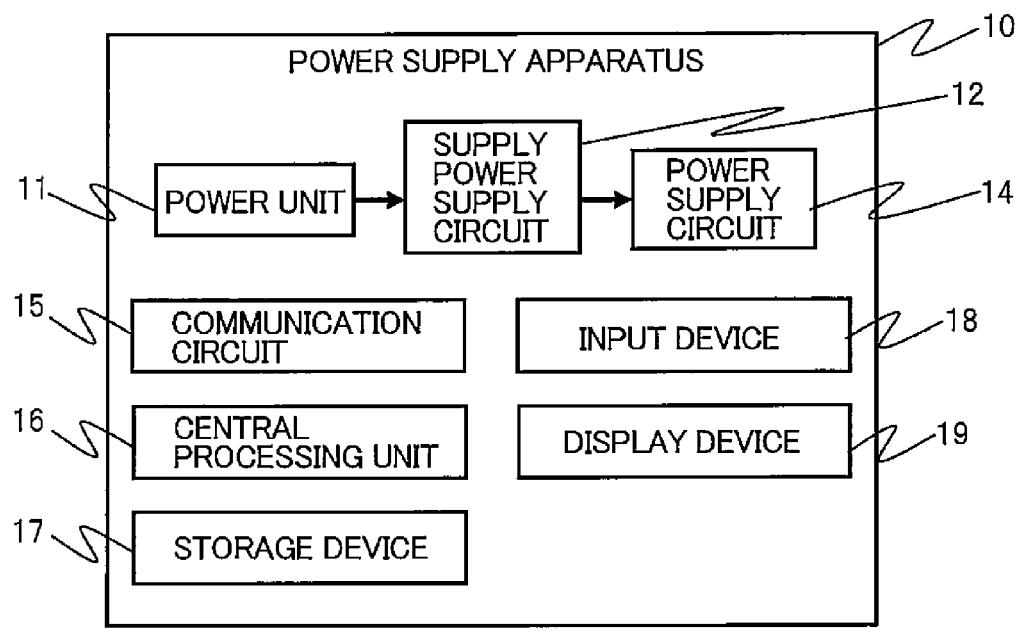
FIG. 2 is a diagram illustrating hardware of a power supply apparatus 10 according to one or more embodiments.

FIG. 2 illustrates main hardware of the power supply apparatus 10 according to one or more embodiments. As illustrated in the figure, the power supply apparatus 10 includes a power unit 11, a supply power supply circuit 12, a power supply circuit 14, a communication circuit 15, a central processing unit 16, a storage device 17, an input device 18, and a display device 19.

The power unit 11 is, for example, a power source of a switching mode or a linear mode, and supplies power for driving components of the power supply apparatus 10. The supply power supply circuit 12 includes a driver circuit (a gate driver, a half-bridge driver, or the like), and generates a driving current having a predetermined frequency to be supplied to the power supply circuit 14 on the basis of the power supplied from the power unit 11.

The power supply circuit 14 includes a resonant circuit configured using a capacitive element such as a capacitor or an inductive element such as a coil, for example. The communication circuit 15 performs communication (for example, wireless LAN (LAN: Local Area Network), communication by IEEE 802.15.1 standard, communication by IEEE 802.15.4 standard) with the power receiving apparatus 20 and the relay apparatus 30. The communication between the power supply apparatus 10 and the power receiving apparatus 20 and the communication between the power supply apparatus 10 and the relay apparatus 30 may be performed by including information to be transmitted in the supply power signal (for example, by modulating the supply power signal by the transmitting information).

The central processing unit 16 is configured using a CPU or an MPU, and performs general control of the power supply apparatus 10. The storage device 17 is configured using a RAM, a ROM, an NVRAM, or the like, and stores programs and data. The input device 18 is an input interface such as a touch panel or ten keys, and receives information from a user. The display device 19 is an output interface such as a liquid crystal panel, and provides a user with information.

Figure 3:
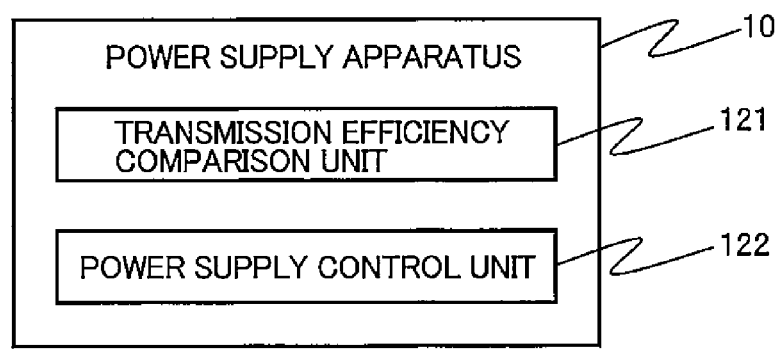
FIG. 3 is a diagram illustrating main functions that the power supply apparatus 10 has in one or more embodiments.

FIG. 3 illustrates main functions that the power supply apparatus 10 has in one or more embodiments. As illustrated in the figure, the power supply apparatus 10 includes a transmission efficiency comparison unit 121 and a power supply control unit 122. These functions are achieved by the hardware of the power supply apparatus 10, or the central processing unit 16 of the power supply apparatus 10 reading and executing the program stored in the storage device 17.

The transmission efficiency comparison unit 121 compares the first transmission efficiency with the aforementioned second transmission efficiency. The power supply control unit 122 executes control so that the power is supplied from the power supply apparatus 10 to the power receiving apparatus 20 in the second power supply mode in the case that the second transmission efficiency is higher than the first transmission efficiency as a result of the comparison, and executes control so that the power is supplied from the power supply apparatus 10 to the power receiving apparatus 20 in the first power supply mode in the case that the second transmission efficiency is equal to or lower than the first transmission efficiency.

For example, in the case of supplying the power in the first power supply mode, the power supply control unit 122 controls a power receiving circuit 31 to be described later, that is provided in the relay apparatus 30, so that the power supply circuit 14 of the power supply apparatus 10 and the power receiving circuit 31 resonate (executes control so as to make a relay function of the relay apparatus 30 work), and supplies the power from the power supply apparatus 10 to the relay apparatus 30. The control is executed by changing capacitance or inductance of an element configuring a resonant circuit of the power receiving circuit 31 by the relay apparatus 30, for example.

Also, in the case of supplying the power in the second power supply mode, the power supply control unit 122 controls the power receiving circuit 31 so that the power supply circuit 14 of the power supply apparatus 10 and the power receiving circuit 31 of the relay apparatus 30 do not resonate (executes control so as not to allow the relay function of the relay apparatus 30 to work), and attenuates the power supplied from the power supply apparatus 10 to the relay apparatus 30 so as not to supply the power to the relay apparatus 30. The control is executed by changing the capacitance or inductance of the element configuring the resonant circuit of the power receiving circuit 31 by the relay apparatus 30, for example.

Figure 4:
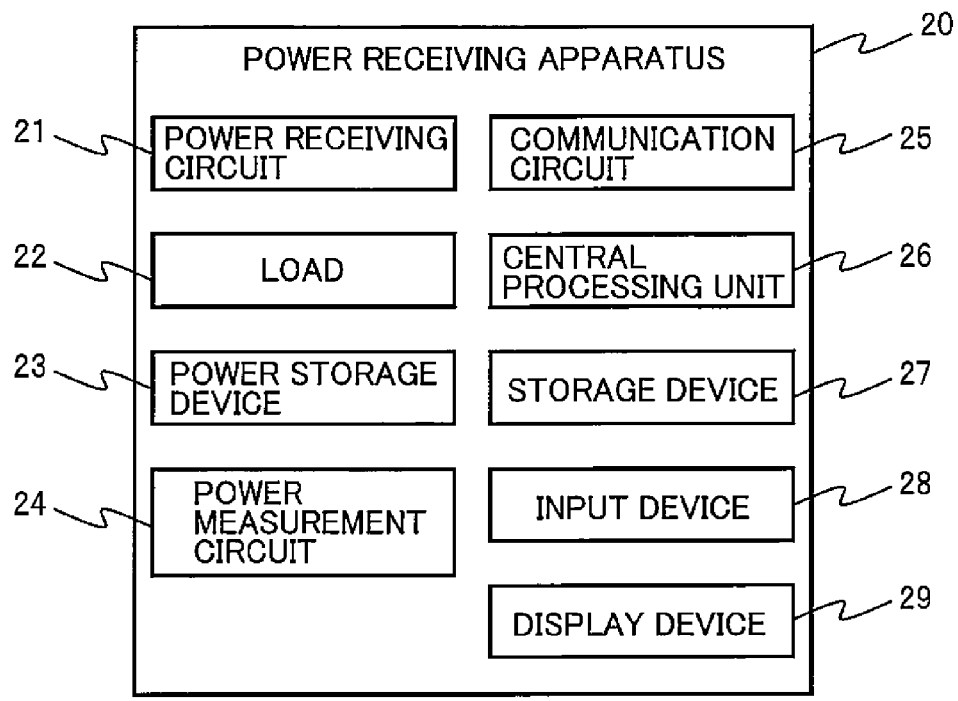
FIG. 4 is a diagram illustrating hardware of a power receiving apparatus according to one or more embodiments 20.

FIG. 4 illustrates hardware of the power receiving apparatus 20 according to one or more embodiments. As illustrated in the figure, the power receiving apparatus 20 includes a power receiving circuit 21, a load 22, a power storage device 23, a power measurement circuit 24, a communication circuit 25, a central processing unit 26, a storage device 27, an input device 28, and a display device 29.

The power receiving circuit 21 includes a resonant circuit configured using a capacitive element such as a capacitor or an inductive element such as a coil, and receives the power supply transmitted from the power supply apparatus 10.

The load 22 is a circuit, an element, or a mechanism that consumes the power supplied from the power supply apparatus 10, for example. When the power receiving apparatus 20 is a cellular phone, the load 22 is a circuit (a control circuit, a transmission/reception circuit, a display circuit, or the like) provided in the cellular phone, for example.

The power storage device 23 includes a storage battery, a rectifier circuit for supplying, to the storage battery, a current based on electromotive force generated in the power receiving circuit 21, a smoothing circuit, a power supply circuit such as a DC/AC converter or a DC/DC converter, or the like. The power storage device 23 is, for example, a secondary battery (a lithium-ion battery, a lithium polymer battery, a nickel hydrogen battery, a nickel cadmium battery, or the like), a battery (an electric double layer capacitor or the like) formed by a capacitive element. The power receiving apparatus 20 may not be surely provided with the power storage device 23. The power receiving apparatus 20 may be the one configured to directly supply the current based on the electromotive force generated in the power receiving circuit 21 to the load 22 like a non-contact type IC card or a passive type RFID tag, for example.

The power measurement circuit 24 measures a power received from the power supply apparatus 10 by the power receiving circuit 21. The communication circuit 25 performs communication (for example, wireless LAN, communication by IEEE 802.15.1 standard, communication by IEEE 802.15.4 standard) with the power supply apparatus 10 and the relay apparatus 30.

The central processing unit 26 is configured using a CPU or an MPU, and performs general control of the power receiving apparatus 20. The storage device 27 is configured using a RAM, a ROM, an NVRAM, or the like, and stores programs and data. The input device 28 is an input interface such as a keyboard or a touch panel. The display device 29 is an output interface such as a liquid crystal panel.

Figure 5:
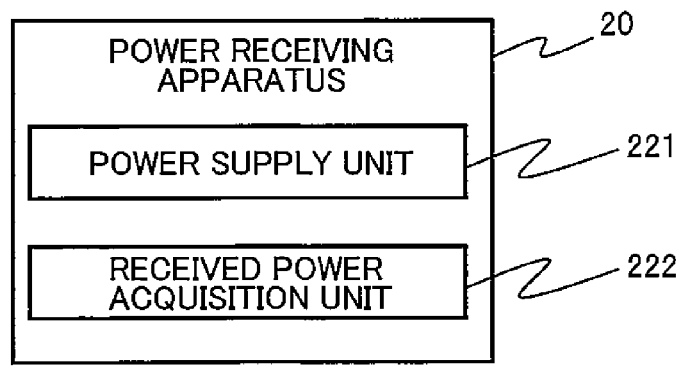
FIG. 5 is a diagram illustrating main functions that the power receiving apparatus 20 has in one or more embodiments.

FIG. 5 illustrates main functions that the power receiving apparatus 20 has in one or more embodiments. As illustrated in the figure, the power receiving apparatus 20 includes a power supply unit 221, and a received power acquisition unit 222. These functions are achieved by the hardware of the power receiving apparatus 20, or the central processing unit 26 of the power receiving apparatus 20 reading and executing the program stored in the storage device 27.

The power supply unit 221 controls the power receiving circuit 21, and supplies the electromotive force generated in the power receiving circuit 21 to the load 22 or the power storage device 23. The received power acquisition unit 222 acquires the power value of the power measured by the power measurement circuit 24.

Figure 6:
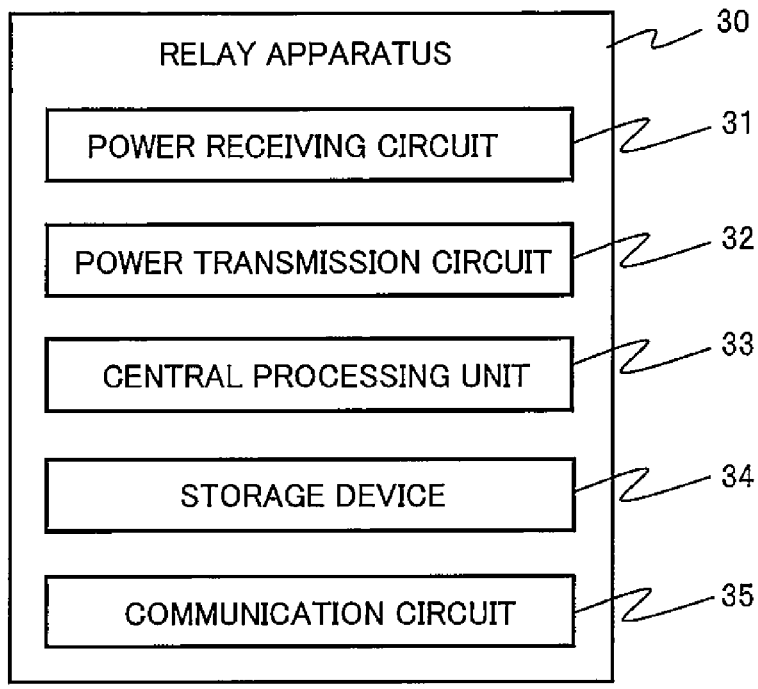
FIG. 6 is a diagram illustrating hardware of a relay apparatus 30 according to one or more embodiments.

FIG. 6 illustrates hardware configuration of the relay apparatus 30 according to one or more embodiments. As illustrated in the figure, the relay apparatus 30 includes a power receiving circuit 31, a power transmission circuit 32, a central processing unit 33, a storage device 34, and a communication circuit 35.

The power receiving circuit 31 and the power transmission circuit 32 both include a resonant circuit configured using a capacitive element such as a capacitor or an inductive element such as a coil. The power transmission circuit 32 transmits (relays) the power received by the power receiving circuit 31 to the power receiving apparatus 20.

The central processing unit 33 is configured using a CPU or an MPU or the like, and performs general control of the relay apparatus 30. The storage device 34 is configured using a RAM, a ROM, an NVRAM, or the like, and stores programs and data. The communication circuit 35 performs communication (for example, wireless LAN, communication by IEEE 802.15.1 standard, communication by IEEE 802.15.4 standard) with the power supply apparatus 10 and the power receiving apparatus 20.

Figure 7:
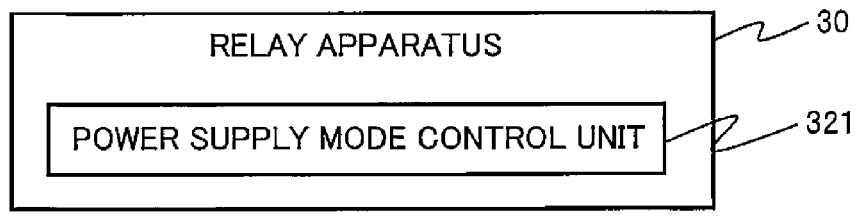
FIG. 7 is a diagram illustrating main functions that the relay apparatus 30 has in one or more embodiments.

FIG. 7 illustrates main functions that the relay apparatus 30 has in one or more embodiments. As illustrated in the figure, the relay apparatus 30 includes a power supply mode control unit 321 which is achieved by the hardware of the relay apparatus 30, or the central processing unit 33 of the relay apparatus 30 reading and executing the program stored in the storage device 34.

The power supply mode control unit 321 controls, on the basis of control signals transmitted from the power receiving apparatus 20, a resonating state of the power supply circuit 14 of the power supply apparatus 10 and the power receiving circuit 31 of the relay apparatus 30, and controls presence/absence of power reception from the power supply apparatus 10.

Subsequently, a process performed in the non-contact power supply system 1 (called a non-contact power supply process S10, hereinafter) will be described.

Figure 8:
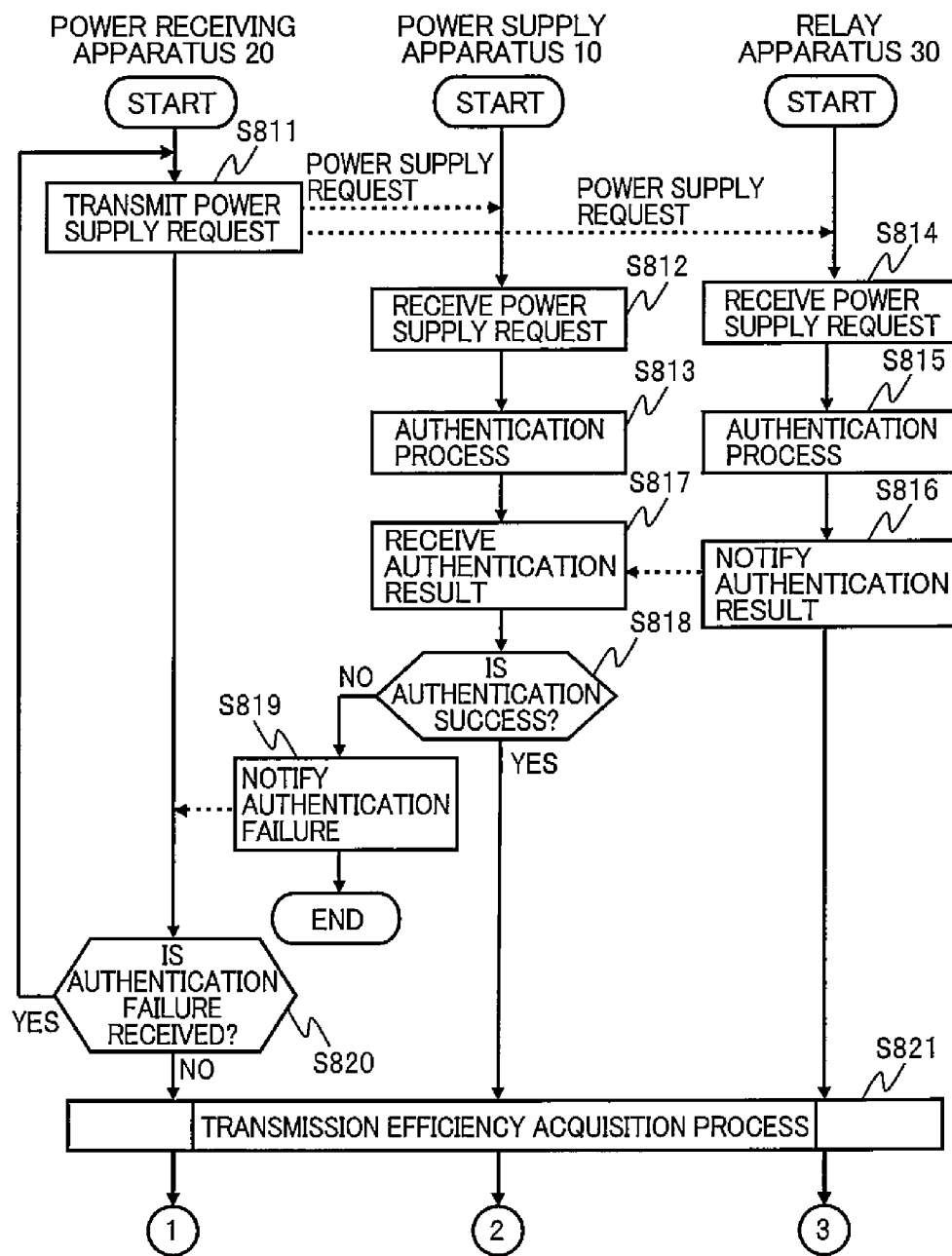
FIG. 8 is a flowchart illustrating a non-contact power supply process S10 according to one or more embodiments.
Figure 9:
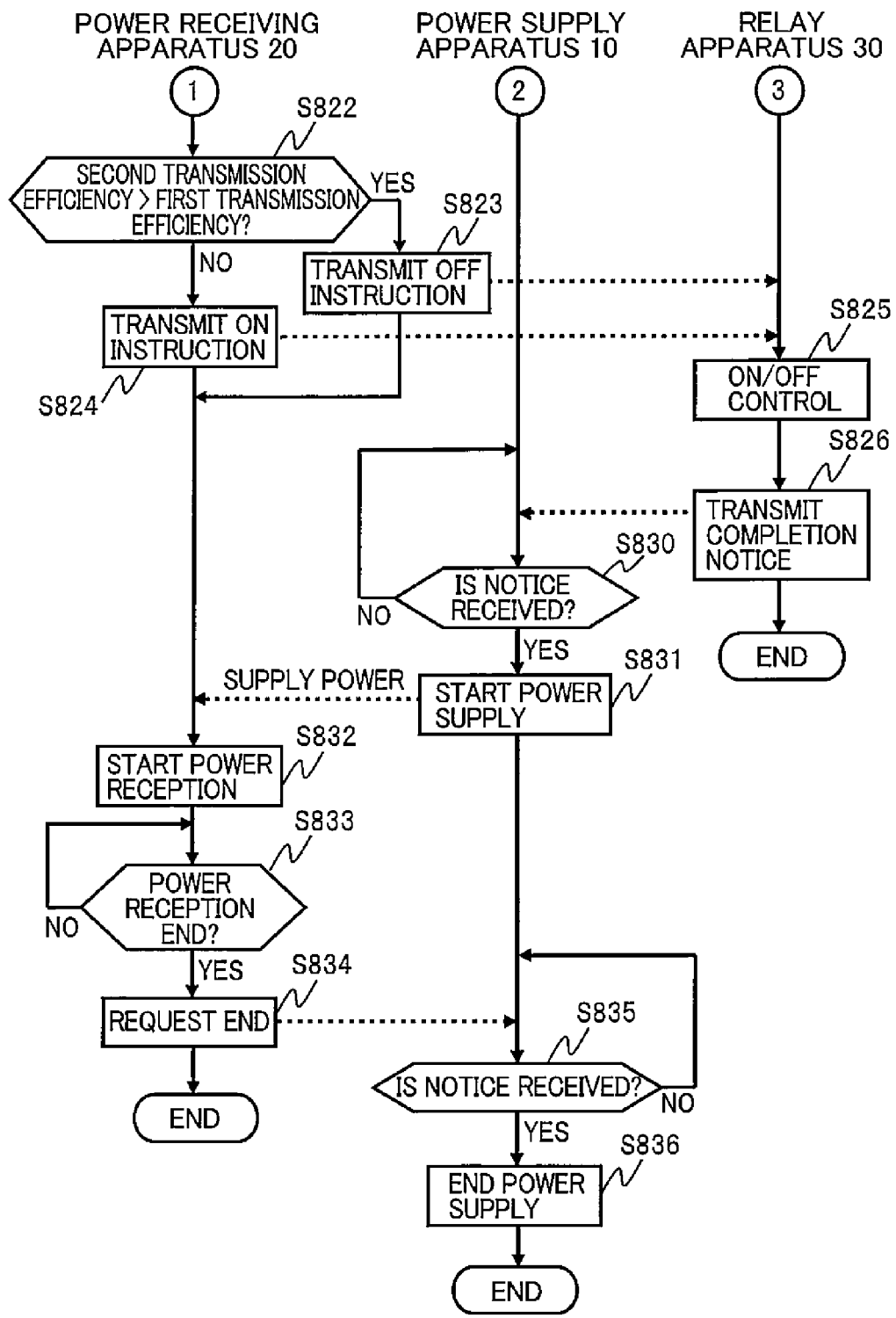
FIG. 9 is a flowchart illustrating the non-contact power supply process S10 according to one or more embodiments.
Figure 10:
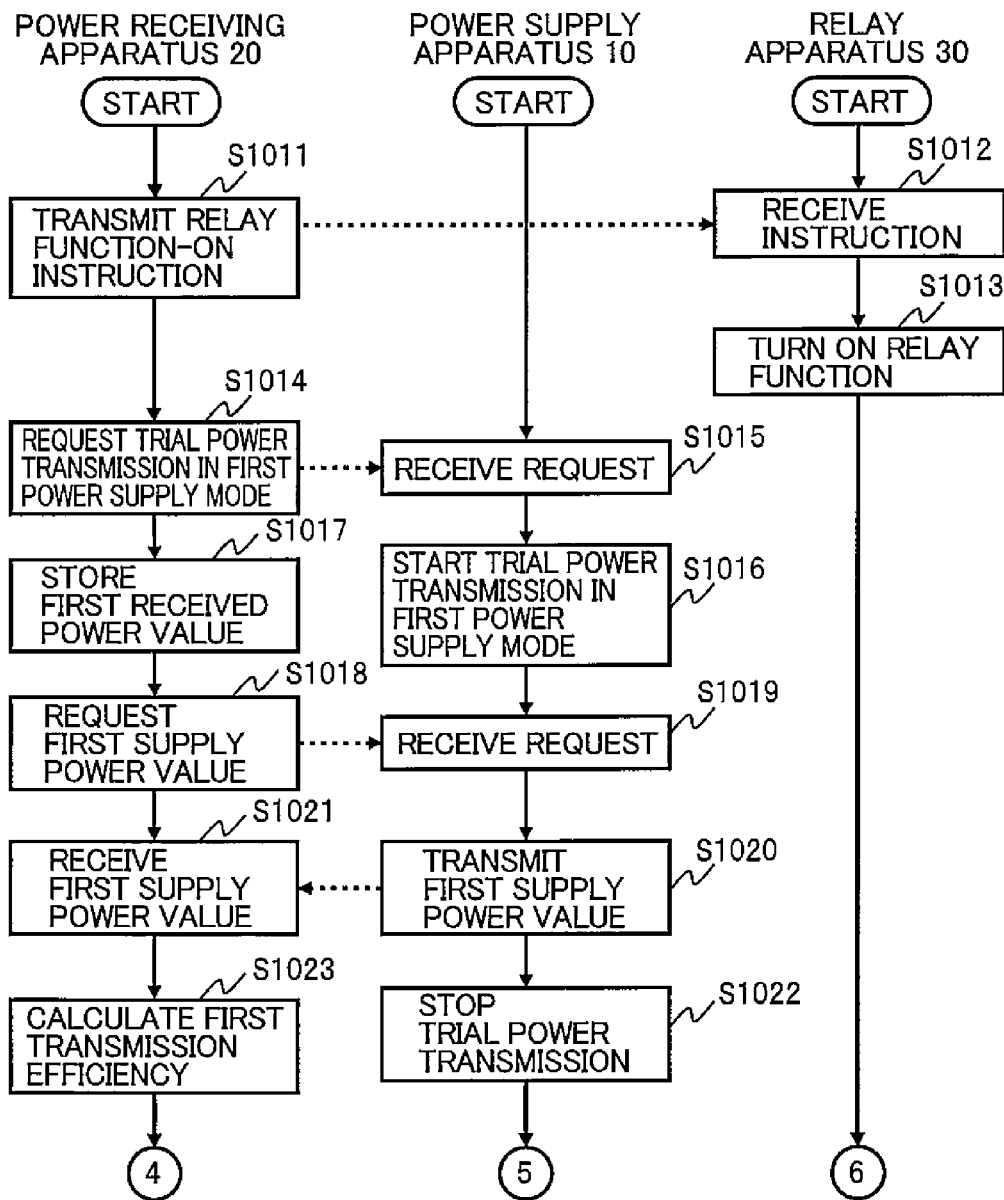
FIG. 10 is a flowchart illustrating a transmission efficiency acquisition process S821 according to one or more embodiments.

FIG. 8 to FIG. 10 are flowcharts illustrating one or more embodiments of the non-contact power supply process S10. Hereinafter, a description will be given with reference to these figures.

FIG. 8 and FIG. 9 are flowcharts illustrating the entire non-contact power supply process S10. As illustrated in FIG. 8, the non-contact power supply process S10 is started by transmission of a power supply request from the power receiving apparatus 20 (S811). For example, in the case that a user performs a predetermined operation to the power receiving apparatus 20 trying to charge the power receiving apparatus 20 such as a cellular phone, the power supply request is transmitted.

When the power supply request is received from the power receiving apparatus 20 (S812), the power supply apparatus 10 authenticates the power receiving apparatus 20 by collating authentication information included in the power supply request with collation information stored in itself (S813). On the other hand, when the power supply request is received from the power receiving apparatus 20 (S814), the relay apparatus 30 authenticates the power receiving apparatus 20 by collating the authentication information included in the received power supply request with collation information stored in itself. A result of authentication performed by the relay apparatus 30 is notified to the power supply apparatus 10 (S815 to S817).

Next, the power supply apparatus 10 determines success or failure of the authentication (S818), on the basis of an authentication result of itself in S813 and the authentication result received from the relay apparatus 30 (S817). That is, in the case that the authentication is success in both of the power supply apparatus 10 and the relay apparatus 30 (S818: YES), the power supply apparatus 10 determines that the authentication of the power receiving apparatus 20 is the success and advances to S821 thereafter. On the other hand, in the case that the authentication is failure in either one of the power supply apparatus 10 and the relay apparatus 30 (S818: NO), the power supply apparatus 10 determines that the authentication of the power receiving apparatus 20 is the failure, and notifies that effect (authentication result) to the power receiving apparatus 20 (S819). Instead of authenticating the power receiving apparatus 20 in both of the power supply apparatus 10 and the relay apparatus 30 in this way, only the power supply apparatus 10 may authenticate the power receiving apparatus 20.

When a notice of authentication failure is received from the power supply apparatus 10 (S820: YES), the power receiving apparatus 20 outputs that effect to the display device 29, and waits for input of a receiving operation of the power supply request again thereafter (S811).

In S821, the power receiving apparatus 20 performs a process for acquiring the transmission efficiency of the non-contact power supply from the power supply apparatus 10 to the power receiving apparatus 20 (called a transmission efficiency acquisition process S821, hereinafter).

In S822 in FIG. 9, the power receiving apparatus 20 compares the first transmission efficiency with the second transmission efficiency, that are acquired in S821. As a result of the comparison, in the case that the second transmission efficiency is higher than the first transmission efficiency (S822: YES), the power receiving apparatus 20, in order to supply the power in the second power supply mode, transmits an instruction to the relay apparatus 30 to turn OFF the relay function for the power transmitted from the power supply apparatus 10 (S823). On the other hand, in the case that the second transmission efficiency is equal to or lower than the first transmission efficiency (S822: NO), the power receiving apparatus 20, in order to supply the power in the first power supply mode, transmits an instruction to the relay apparatus 30 to turn ON the relay function for the power transmitted from the power supply apparatus 10 (S824).

The relay apparatus 30 controls the relay function to be OFF in the case of receiving an OFF instruction from the power receiving apparatus 20, and controls the relay function to be ON in the case of receiving an ON instruction from the power receiving apparatus 20 (S825). When the control is completed, the relay apparatus 30 notifies the power supply apparatus 10 of that effect (S826).

When the notice is received (S830: YES), the power supply apparatus 10 starts the non-contact power supply to the power receiving apparatus 20 (S831), and the power receiving apparatus 20 starts reception of the supply power transmitted from the power supply apparatus 10 and the relay apparatus 30 (S832).

Thereafter, the power receiving apparatus 20 continues power reception until a moment to end the power reception comes (S833: NO). The moment to end the power reception comes, for example, in the case that charging of a storage battery provided in the power receiving apparatus 20 is completed, a user performs a predetermined operation to the input device 28 of the power receiving apparatus 20, or the power receiving apparatus 20 or the power supply apparatus 10 detects some kind of abnormality such as temperature rise of the storage battery.

When the moment to end the power reception comes (S833: YES), the power receiving apparatus 20 notifies the power supply apparatus 10 of that effect (S834). When the notice is received (S835: YES), the power supply apparatus 10 ends the power supply (S836).

Figure 11:
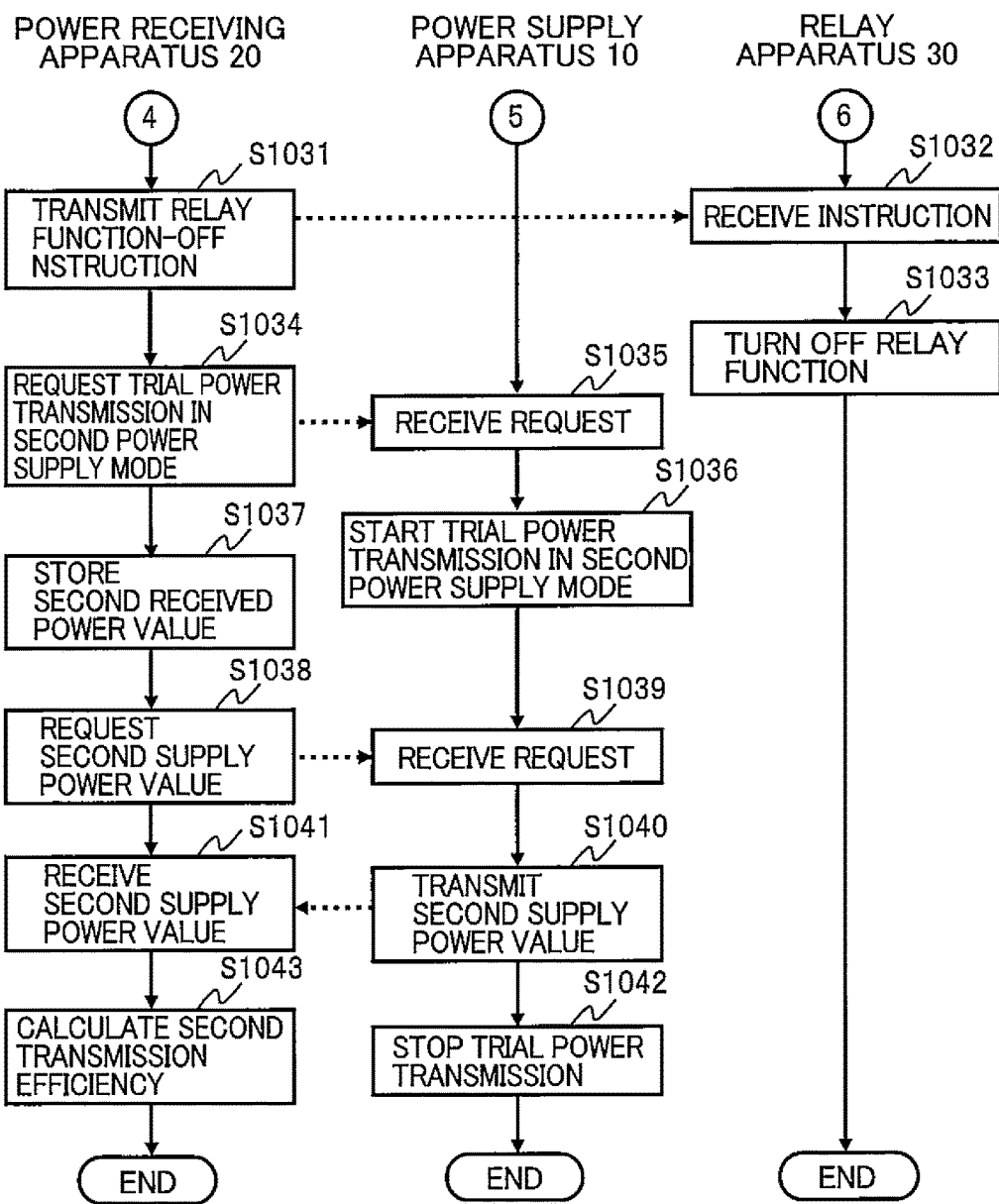
FIG. 11 is a flowchart illustrating the non-contact power supply process S20 according to one or more embodiments.

FIG. 10 and FIG. 11 are flowcharts illustrating detail of the transmission efficiency acquisition process S821 in FIG. 8.

As illustrated in the figure, first, the power receiving apparatus 20 transmits an instruction (an ON instruction) to the relay apparatus 30 to make the relay function of the relay apparatus 30 work (S1011). When the ON instruction is received (S1012), the relay apparatus 30 makes the relay function work (S1013).

Subsequently, the power receiving apparatus 20 requests trial power transmission in the first power supply mode from the power supply apparatus 10 (S1014). When the request is received (S1015), the power supply apparatus 10 starts the power supply in the first power supply mode (S1016). When the power supply is started, the power receiving apparatus 20 stores a value of the power received during the trial power transmission (called a first received power value, hereinafter) (S1017).

Next, the power receiving apparatus 20 requests a value of the supply power (a value of the supply power transmitted on trial) from the power supply apparatus 10 (S1018). When the request is received (S1019), the power supply apparatus 10 transmits the value of the supply power transmitted on trial (called a first supply power value, hereinafter) (S1020). Thereafter, the power supply apparatus 10 stops the trial power transmission (S1022).

When the first supply power value is received from the power supply apparatus 10 (S1021), the power receiving apparatus 20 obtains the first transmission efficiency (S1023) on the basis of the first supply power value and the first received power value stored in S1017.

Subsequently, in order to perform trial power transmission in the second power supply mode, as illustrated in FIG. 11, the power receiving apparatus 20 transmits an instruction (an OFF instruction) to the relay apparatus 30 to stop the relay function of the relay apparatus 30 (S1031). When the OFF instruction is received (S1032), the relay apparatus 30 stops the relay function (S1033).

Next, the power receiving apparatus 20 requests trial power transmission in the second power supply mode from the power supply apparatus 10 (S1034). When the request is received (S1035), the power supply apparatus 10 starts the power supply in the second power supply mode (S1036). When the power supply is started, the power receiving apparatus 20 stores a value of the power received during the trial power transmission (called a second received power value, hereinafter) (S1037).

Subsequently, the power receiving apparatus 20 requests a value of the supply power (a value of the supply power transmitted on trial) from the power supply apparatus 10 (S1038). When the request is received (S1039), the power supply apparatus 10 transmits the value of the supply power transmitted on trial (called a second supply power value, hereinafter) (S1040). Thereafter, the power supply apparatus 10 stops the power supply (S1042).

When the second supply power value is received from the power supply apparatus 10 (S1041), the power receiving apparatus 20 obtains the second transmission efficiency (S1043), on the basis of the second supply power value and the second received power value stored in S1037.

In this way, the power receiving apparatus 20 mainly performs the processes of comparing the transmission efficiency and turning ON and OFF the relay function so that configurations of the power supply apparatus 10 and the relay apparatus 30 can be simplified.

While the power receiving apparatus 20 mainly performs the processes of comparing the transmission efficiency and turning ON and OFF the relay function, the power supply apparatus 10 mainly performs the processes in one or more other embodiments.

Figure 12:
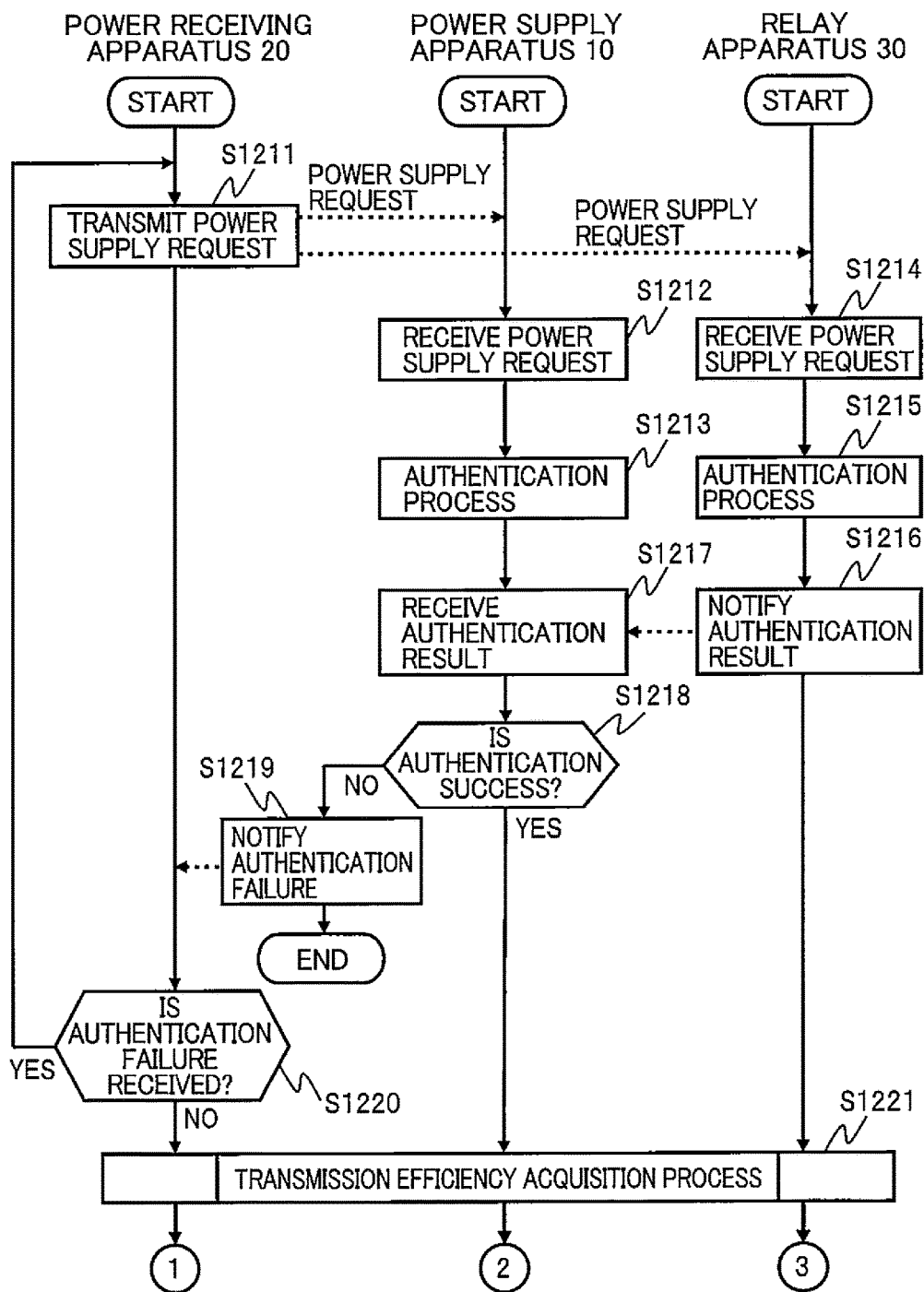
FIG. 12 is a flowchart illustrating the non-contact power supply process S20 according to one or more embodiments.
Figure 13:
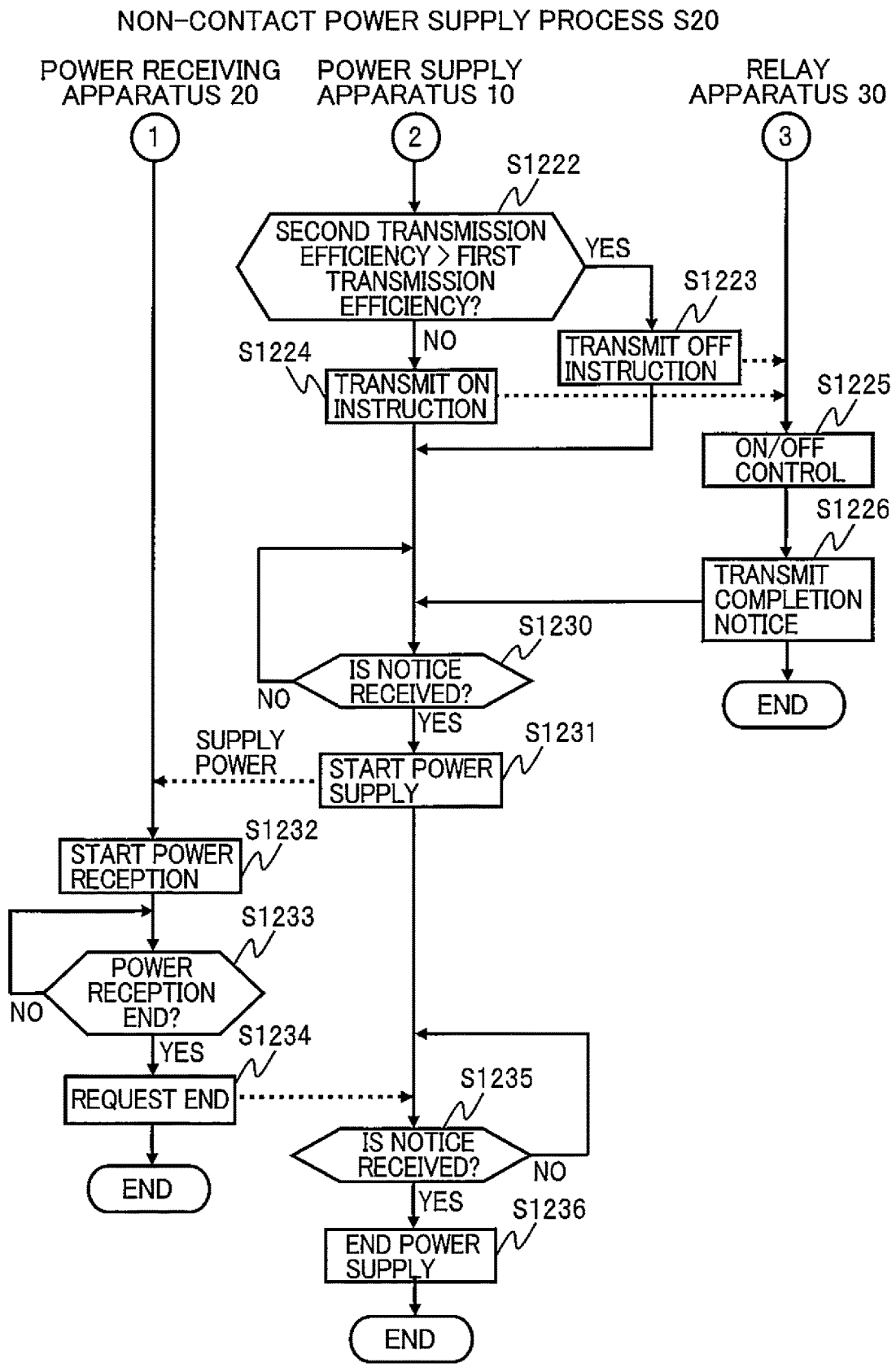
FIG. 13 is a flowchart illustrating a transmission efficiency acquisition process S1121 according to one or more embodiments.

FIG. 12 and FIG. 13 are flowcharts illustrating the entire non-contact power supply process S10 to be illustrated as one or more other embodiments.

First, since processes S1211 to S1220 in FIG. 12 are similar to the processes S811 to S820 in FIG. 8, the description will be omitted.

In S1221, the power supply apparatus 10 acquires the first transmission efficiency and the second transmission efficiency by performing a process for acquiring the transmission efficiency (called a transmission efficiency acquisition process S1221, hereinafter).

In S1222 in FIG. 13, the power supply apparatus 10 compares the first transmission efficiency with the second transmission efficiency, that are acquired in S1221. As a result of the comparison, in the case that the second transmission efficiency is higher than the first transmission efficiency (S1222: YES), the power supply apparatus 10, in order to supply the power in the second power supply mode, transmits an instruction (an OFF instruction) to the relay apparatus 30 to turn OFF its function (S1223). On the other hand, in the case that the second transmission efficiency is equal to or lower than the first transmission efficiency (S1222: NO), the power supply apparatus 10, in order to supply the power in the first power supply mode, transmits an instruction (an ON instruction) to the relay apparatus 30 to turn ON its function (S1224).

The relay apparatus 30 controls the relay function to be OFF in the case of receiving the OFF instruction from the power supply apparatus 10, and controls the relay function to be ON in the case of receiving the ON instruction from the power supply apparatus 10 (S1225). When the control is completed, the relay apparatus 30 notifies the power supply apparatus 10 of that effect (S1226).

When the notice is received (S1230: YES), the power supply apparatus 10 starts the non-contact power supply to the power receiving apparatus 20 (S1231), and the power receiving apparatus 20 starts the reception of the supply power transmitted from the power supply apparatus 10 (S1232).

Thereafter, the power receiving apparatus 20 continues the power reception until a moment to end the power reception comes (S1233: NO).

When the moment to end the power reception comes (S1233: YES), the power receiving apparatus 20 notifies the power supply apparatus 10 of that effect (S1234). When the notice is received (S1235: YES), the power supply apparatus 10 ends the power supply (S1236).

Figure 14:
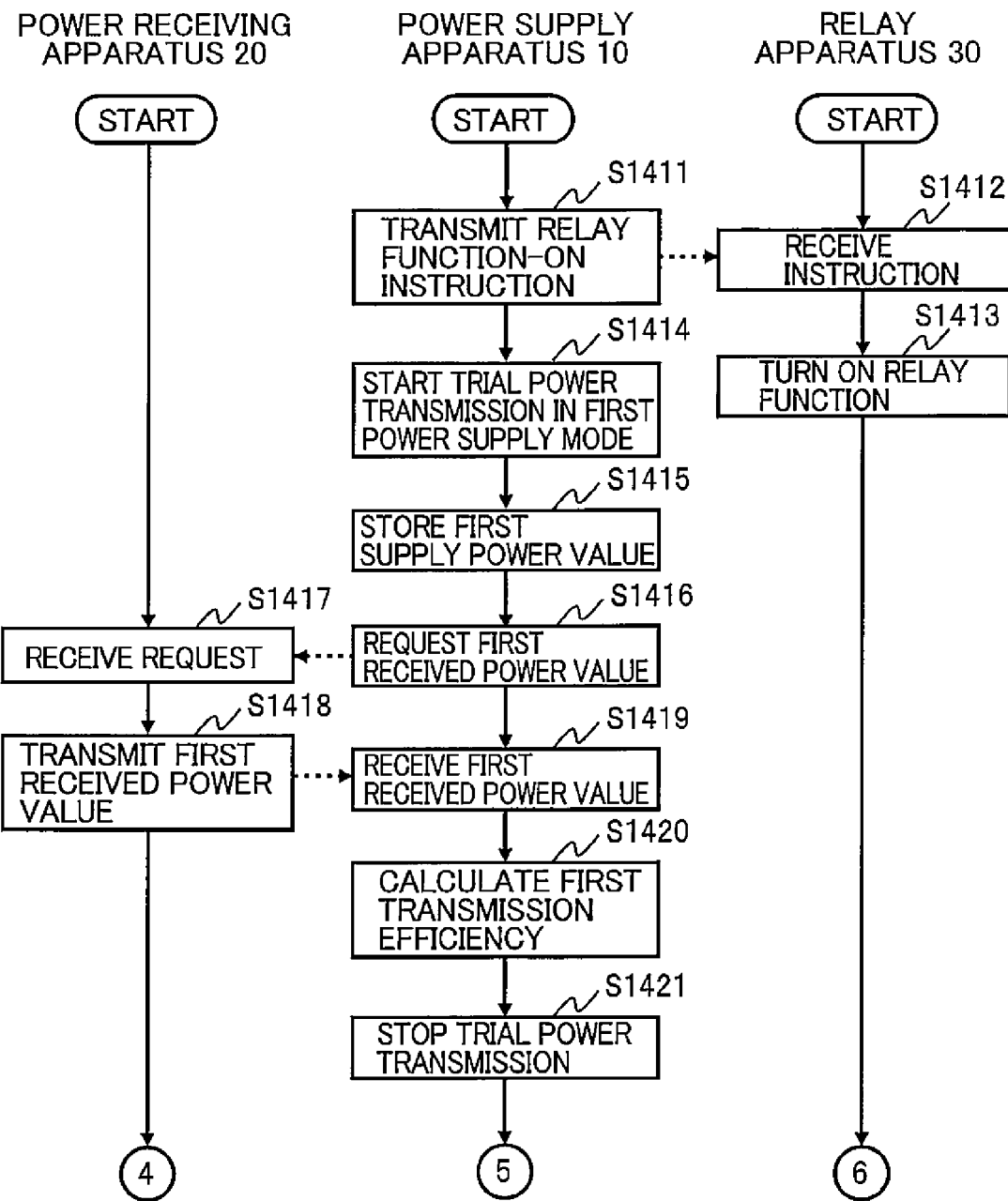
FIG. 14 is a flowchart illustrating detail of the transmission efficiency acquisition process S1221 according to one or more embodiments.
Figure 15:
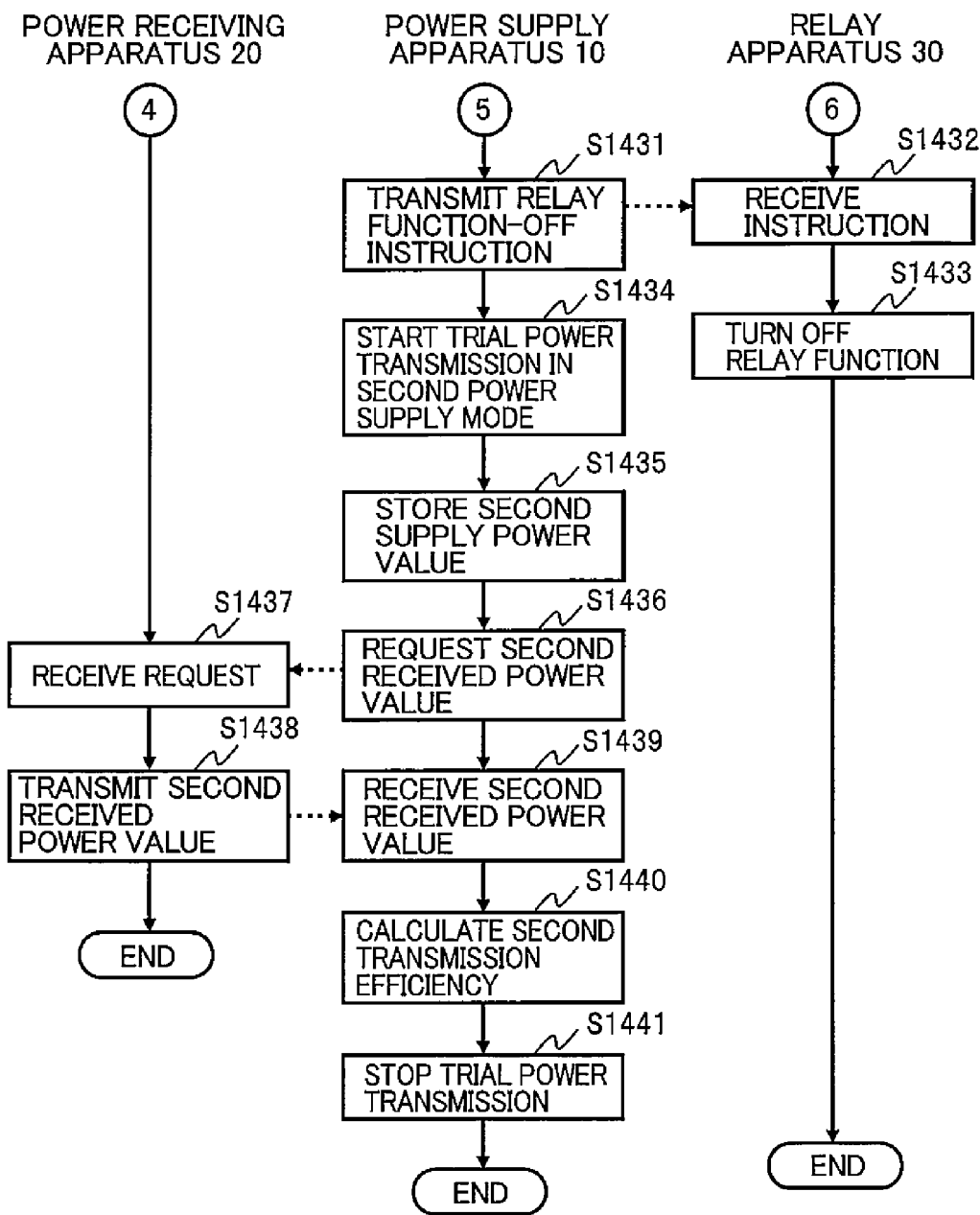
FIG. 15 is a flowchart illustrating detail of the transmission efficiency acquisition process S1521 according to one or more embodiments.

FIG. 14 and FIG. 15 are flowcharts illustrating detail of the transmission efficiency acquisition process S1221 in FIG. 12.

As illustrated in the figure, first, the power supply apparatus 10 transmits an instruction (an ON instruction) to the relay apparatus 30 to make the relay function of the relay apparatus 30 work (S1411). When the ON instruction is received (S1412), the relay apparatus 30 makes the relay function work (S1413).

Subsequently, the power supply apparatus 10 starts the trial power transmission in the first power supply mode (S1414). When the trial power transmission is started, the power supply apparatus 10 stores a power value of the trial power transmission (called a first supply power value, hereinafter) (S1415).

Next, the power supply apparatus 10 requests transmission of a value of the received power (a power value received during the trial power transmission by the power receiving apparatus 20. This is called a first received power value, hereinafter) from the power receiving apparatus 20 (S1416). When the request is received (S1417), the power receiving apparatus 20 transmits the first received power value (S1418).

When the first received power value is received from the power receiving apparatus 20 (S1419), the power supply apparatus 10 obtains the first transmission efficiency (S1420), on the basis of the first received power and the first supply power value stored in S1415. Thereafter, the power supply apparatus 10 stops the trial power transmission (S1421).

Subsequently, in order to perform trial power transmission in the second power supply mode, as illustrated in FIG. 14, the power supply apparatus 10 transmits an instruction (an OFF instruction) to the relay apparatus 30 to stop the relay function of the relay apparatus 30 (S1431). When the instruction is received (S1432), the relay apparatus 30 stops the relay function (S1433).

Next, the power supply apparatus 10 starts the trial power transmission in the second power supply mode (S1434). When the trial power transmission is started, the power supply apparatus 10 stores a power value of the trial power transmission (called a second supply power value, hereinafter) (S1435).

Subsequently, the power supply apparatus 10 requests a value of the received power (a power value received during the trial power transmission by the power receiving apparatus 20. This is called a second received power value, hereinafter) from the power receiving apparatus 20 (S1436). When the request is received (S1437), the power receiving apparatus 20 transmits the second received power value (S1438).

When the second received power value is received from the power receiving apparatus 20 (S1439), the power supply apparatus 10 obtains the second transmission efficiency (S1440), on the basis of the second received power value and the second supply power value stored in S1435. Thereafter, the power supply apparatus 10 stops the power supply (S1441).

In this way, the power supply apparatus 10 mainly performs the processes of comparing the transmission efficiency and turning ON and OFF the relay function so that configurations of the power receiving apparatus 20 and the relay apparatus 30 can be simplified.

As described above, according to the non-contact power supply system 1 of one or more embodiments, in the case that the second transmission efficiency is higher than the first transmission efficiency, that is, in the case that the transmission efficiency is rather lowered by providing the relay apparatus 30 depending on influence of interference, multipath, reflected waves, or the like, the power is supplied from the power supply apparatus 10 to the power receiving apparatus 20 in the second power supply mode, that is, without interposing the relay apparatus 30, so that the mode in which the higher transmission efficiency can be obtained is appropriately selected and the non-contact power supply can be efficiently performed from the power supply apparatus 10 to the power receiving apparatus 20.

Also, since the first power supply mode and the second power supply mode are selected by changing the capacitance or inductance of the element configuring the resonant circuit of the relay apparatus 30, a mechanism of selecting the first power supply mode or the second power supply mode by a simple mechanism can be achieved.

The description of the one or more embodiments described above is to facilitate understanding of the present invention and does not limit the present invention. The present invention may be modified or altered without departing from the scope thereof, and of course the present invention includes its equivalents.

For example, the mechanism of selecting the first power supply mode and the second power supply mode may be achieved by controlling orientation of the power receiving circuit 31 of the relay apparatus 30. In this case, for example, to supply the power in the second power supply mode, the power supply apparatus 10 or the power receiving apparatus 20 controls the orientation of the power receiving circuit 31 of the relay apparatus 30 so as to be off a direction of the power supply apparatus 10 or a direction of the power receiving apparatus 20 to attenuate the power to be received by the relay apparatus 30. Also, the mechanism may be achieved by providing a shield such as a metal plate between the power supply apparatus 10 and the relay apparatus 30 and controlling whether or not to interpose the shield between the power supply apparatus 10 and the relay apparatus 30, for example.

In the case that a positional relation between the power supply apparatus 10 and the power receiving apparatus 20 changes during the power supply such as the case that the power receiving apparatus 20 moves, the first transmission efficiency and the second transmission efficiency may be repeatedly acquired and compared during the power supply to switch to an appropriate power supply mode in real time according to the result.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Non-contact power supply system
10 Power supply apparatus
14 Power supply circuit
121 Transmission efficiency comparison unit
122 Power supply control unit
20 Power receiving apparatus
21 Power receiving circuit
221 Power supply unit
222 Received power acquisition unit
30 Relay apparatus
31 Power receiving circuit
32 Power transmission circuit
321 Power supply mode control unit

The invention claimed is:

1. A non-contact power supply system comprising a power supply apparatus, a power receiving apparatus, and a relay apparatus, wherein
first transmission efficiency which is transmission efficiency of supply power in the case of supplying power in a first power supply mode of directly supplying the power from the power supply apparatus to the power receiving apparatus and also supplying the power from the power supply apparatus to the power receiving apparatus through the relay apparatus, and second transmission efficiency which is transmission efficiency of supply power in the case of supplying the power in a second power supply mode of directly supplying the power from the power supply apparatus to the power receiving apparatus and not supplying the power from the power supply apparatus to the power receiving apparatus through the relay apparatus are compared, the power is supplied from the power supply apparatus to the power receiving apparatus in the second power supply mode in the case that the second transmission efficiency is higher than the first transmission efficiency, and the power is supplied from the power supply apparatus to the power receiving apparatus in the first power supply mode in the case that the second transmission efficiency is equal to or lower than the first transmission efficiency.

2. The non-contact power supply system according to claim 1, wherein the power is supplied from the power supply apparatus to the power receiving apparatus in an magnetic resonance mode, and in the case of supplying the power in the second power supply mode, by executing control so that a resonant circuit of the power supply apparatus and a resonant circuit of the relay apparatus do not resonate, the power supplied from the relay apparatus to the power receiving apparatus is attenuated.

3. The non-contact power supply system according to claim 2, wherein the control is executed so that the resonant circuit of the power supply apparatus and the resonant circuit of the relay apparatus do not resonate by changing capacitance or inductance of an element configuring the resonant circuit of the relay apparatus.

4. The non-contact power supply system according to claim 1, comprising a mechanism that controls orientation of a resonant circuit of the relay apparatus for receiving supply power transmitted from the power supply apparatus, wherein, in the case of supplying the power in the second power supply mode, by controlling the orientation of the resonant circuit of the relay apparatus, the power supplied from the relay apparatus to the power receiving apparatus is attenuated.

5. The non-contact power supply system according to claim 1, comprising a shield control mechanism that controls whether or not to interpose a shield between the power supply apparatus and the relay apparatus, wherein, in the case of supplying the power in the second power supply mode, by interposing a shield between the power supply apparatus and the relay apparatus, the power supplied from the relay apparatus to the power receiving apparatus is attenuated.

6. A control method for a non-contact power supply system including a power supply apparatus, a power receiving apparatus, and a relay apparatus, comprising the steps of:

comparing first transmission efficiency which is transmission efficiency of supply power in the case of supplying power in a first power supply mode of directly supplying the power from the power supply apparatus to the power receiving apparatus and also supplying the power from the power supply apparatus to the power receiving apparatus through the relay apparatus, and second transmission efficiency which is transmission efficiency of supply power in the case of supplying the power in a second power supply mode of directly supplying the power from the power supply apparatus to the power receiving apparatus but not supplying the power from the power supply apparatus to the power receiving apparatus through the relay apparatus; and supplying the power from the power supply apparatus to the power receiving apparatus in the second power supply mode in the case that the second transmission efficiency is higher than the first transmission efficiency.

* * * * *